United States Patent [19]
Gallagher et al.

[11] Patent Number: 5,735,018
[45] Date of Patent: Apr. 7, 1998

[54] BLOWER FOR MOVING DEBRIS

[75] Inventors: William F. Gallagher; Mark R. Pfeiffer, both of Southampton, Pa.

[73] Assignee: Schiller-Pfeiffer, Incorporated, Southampton, Pa.

[21] Appl. No.: 725,281

[22] Filed: Oct. 2, 1996

[51] Int. Cl.⁶ ............................................. A47L 5/14
[52] U.S. Cl. ................... 15/405; 15/330; 15/328; 415/208.1
[58] Field of Search .................... 15/328, 330, 405; 415/208.1, 182.1, 126

[56] References Cited

U.S. PATENT DOCUMENTS

| | | |
|---|---|---|
| 969,587 | 9/1910 | Williams . |
| 1,997,387 | 7/1935 | McCord . |
| 2,075,587 | 3/1937 | Mesinger . |
| 2,135,827 | 11/1938 | Marty . |
| 2,188,741 | 1/1940 | Roberts . |
| 2,250,844 | 7/1941 | Roettger . |
| 2,279,425 | 4/1942 | Voysey . |
| 2,290,423 | 7/1942 | Funk . |
| 2,330,938 | 10/1943 | Williams . |
| 2,377,540 | 6/1945 | Costa . |
| 2,450,186 | 9/1948 | Curry . |
| 2,561,882 | 7/1951 | Patton . |
| 2,945,254 | 7/1960 | Boissonnault . |
| 3,124,200 | 3/1964 | Wilson . |
| 3,241,173 | 3/1966 | Finn . |
| 3,539,271 | 11/1970 | Greenwood . |
| 3,618,157 | 11/1971 | Bassin . |
| 3,627,440 | 12/1971 | Wood . |
| 3,728,850 | 4/1973 | Flory . |
| 3,874,191 | 4/1975 | Hudson . |
| 3,898,786 | 8/1975 | Lundahl . |
| 3,959,846 | 6/1976 | Yasuda . |
| 3,968,938 | 7/1976 | Ruhl et al. . |
| 4,017,206 | 4/1977 | Döge et al. . |
| 4,076,460 | 2/1978 | Roof . |
| 4,078,365 | 3/1978 | Ingalls . |
| 4,118,826 | 10/1978 | Kaeser . |
| 4,187,577 | 2/1980 | Hansen et al. . |
| 4,227,280 | 10/1980 | Comer . |
| 4,476,773 | 10/1984 | Fehr . |
| 4,549,848 | 10/1985 | Wallman . |
| 4,573,869 | 3/1986 | Kitamoto .................. 415/182.1 X |
| 4,597,203 | 7/1986 | Middleton . |
| 4,799,287 | 1/1989 | Belanger et al. . |
| 5,026,251 | 6/1991 | Kinoshita et al. . |
| 5,044,887 | 9/1991 | Duthie et al. . |
| 5,107,566 | 4/1992 | Schmid . |
| 5,171,128 | 12/1992 | Williamson et al. . |
| 5,324,167 | 6/1994 | Moczadlo et al. ........ 415/208.1 X |
| 5,551,836 | 9/1996 | Roth et al. ............... 415/208.1 X |
| 5,588,178 | 12/1996 | Liu ................................... 15/330 |

OTHER PUBLICATIONS

Cover and three pages from Little Wonder brochure (Sep. 1995).

*Primary Examiner*—Jeanette E. Chapman
*Attorney, Agent, or Firm*—Panitch Schwarze Jacobs & Nadel, P.C.

[57] ABSTRACT

An improved blower for moving debris on a surface is provided. The blower includes a frame mounted on wheels and a motor mounted to the frame. A blower housing with an inlet opening and a discharge chute is also mounted to the frame. A fan is located in the blower housing and is drivingly connected to the motor to generate an air flow having a predetermined volumetric flow. An adjustable height, pivotable deflector is mounted in the discharge chute to split the air flow into upper and lower portions. The deflector is pivotable from a first, downwardly inclined position, to concentrate the lower portion of the air flow along the surface to create a lifting force for lifting and moving the debris while the upper portion of the air flow moves the debris outwardly, to a second position, in which the pivotable deflector is upwardly inclined to create an expanded air flow profile. The deflector height is adjustable to adjust the volumetric flow of the upper and lower portions.

6 Claims, 4 Drawing Sheets

BLOWER FOR MOVING DEBRIS

FIELD OF THE INVENTION

The present invention relates to a blower for moving debris on a surface, and more particularly, to a leaf blower for lifting and moving leaves and other debris from a lawn, driveway or other surface.

BACKGROUND OF THE INVENTION

Mobile blowers for moving leaves and other debris from lawns, driveways or other surfaces are generally known in the art. One such known unit is illustrated in FIG. 8, and directs a blast of air from a blower outlet towards or across the surface to be cleared. In such prior units, the blower outlet is adjacent to the ground to produce a tangential air blast from the bottom of the blower housing parallel with the ground or other surface.

Such units are provided with a deflector mounted above the outlet portion which extends outward from the blower housing and allows the operator to vary the angle at which the air blast is directed against the ground or other surface. For example, when leaves are wet and soggy, they become matted and are more difficult to move unless the air blast is directed downwardly at an acute angle. The deflector allows the air blast to be directed downwardly by the operator at the required angle necessary to lift and move the debris or leaves from the surface in order to form windrows for later collection. However, because the deflector extends outward from the side of the blower, it is often bent or damaged by striking trees, fence posts, and the like.

One known problem with such prior units is that there is a tendency for swirling of the air flow leaving the blower when the deflector is angled downwardly. This can result in leaves being carried back into the cleared path. There is also a problem with moving a windrows of leaves or debris once they have accumulated to a height which is greater than the discharge chute due to the swirling created by the deflected air flow deflecting upward from the surface to be cleared.

SUMMARY OF THE INVENTION

Briefly stated, the present invention is directed to an improved blower for moving debris on a surface. The blower includes a frame mounted on wheels. A motor is mounted to the frame. A blower housing with an inlet opening and a discharge chute is also mounted to the frame. A fan is located in the blower housing and is drivingly connected to the motor to generate an air flow having a predetermined volumetric flow. An adjustable height, pivotable deflector is mounted in the discharge chute to split the air flow into upper and lower portions. The deflector is pivotable from a first, downwardly inclined position, to concentrate the lower portion of the air flow along the surface to create a lifting force for lifting and moving the debris while the upper portion of the air flow moves the debris outwardly, to a second position, in which the pivotable deflector is upwardly inclined to create an expanded air flow profile. The deflector height is adjustable to adjust the volumetric flow of the upper and lower portions.

BRIEF DESCRIPTION OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which are presently preferred. It should be understood, however, that the invention is not limited to the precise arrangements and instrumentalities shown. In the drawings.

DETAILED DESCRIPTION OF PREFERRED EMBODIMENT

Figure 1:
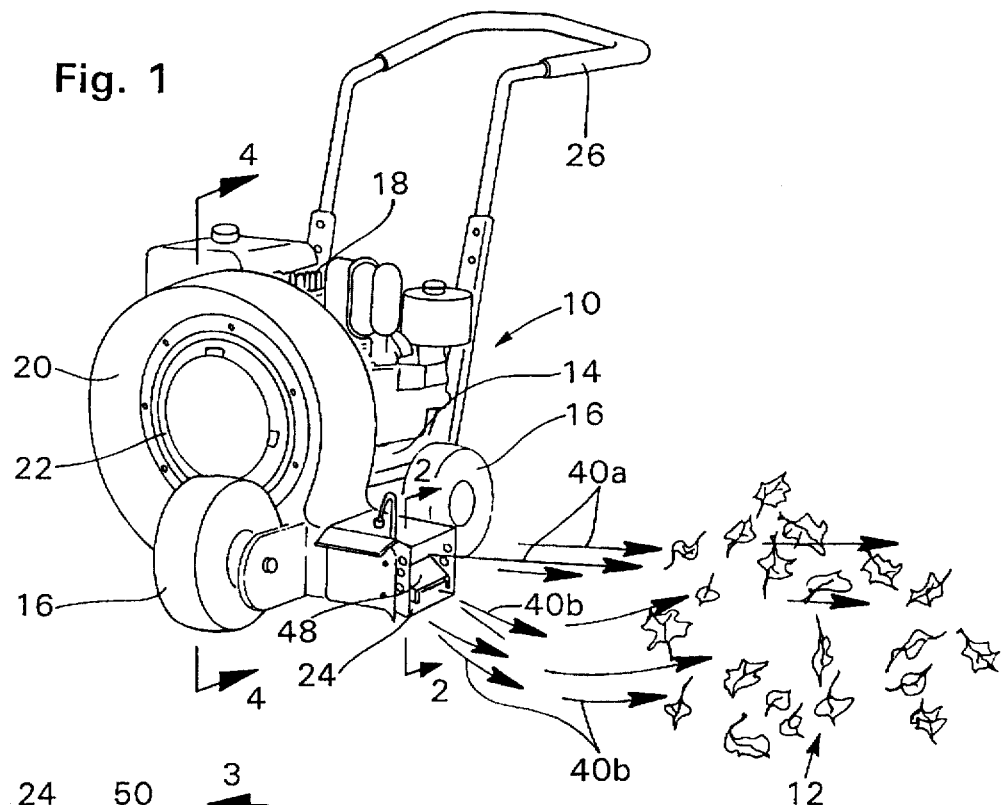
FIG. 1 is a perspective view of a blower for a moving debris in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the blower for moving debris and designated parts thereof. The terminology includes the words above specifically mentioned, derivatives thereof and words of similar import.

Referring to the drawings, wherein like numerals indicate like elements throughout, there is shown in FIGS. 1–5 an improved blower 10 for moving debris, such as leaves 12, on a surface, such as a lawn or driveway.

As shown in FIG. 1, the blower 10 includes a frame 14 mounted on wheels 16. A motor 18 is mounted to the frame 14. The motor 18 is preferably an internal combustion engine. A blower housing 20 with an inlet opening 22 and a discharge chute 24 is mounted to the frame 14. A handle 26 is also attached to the frame 14 and is adapted for a user to push in order to move the blower 10 along the surface.

Figure 4:
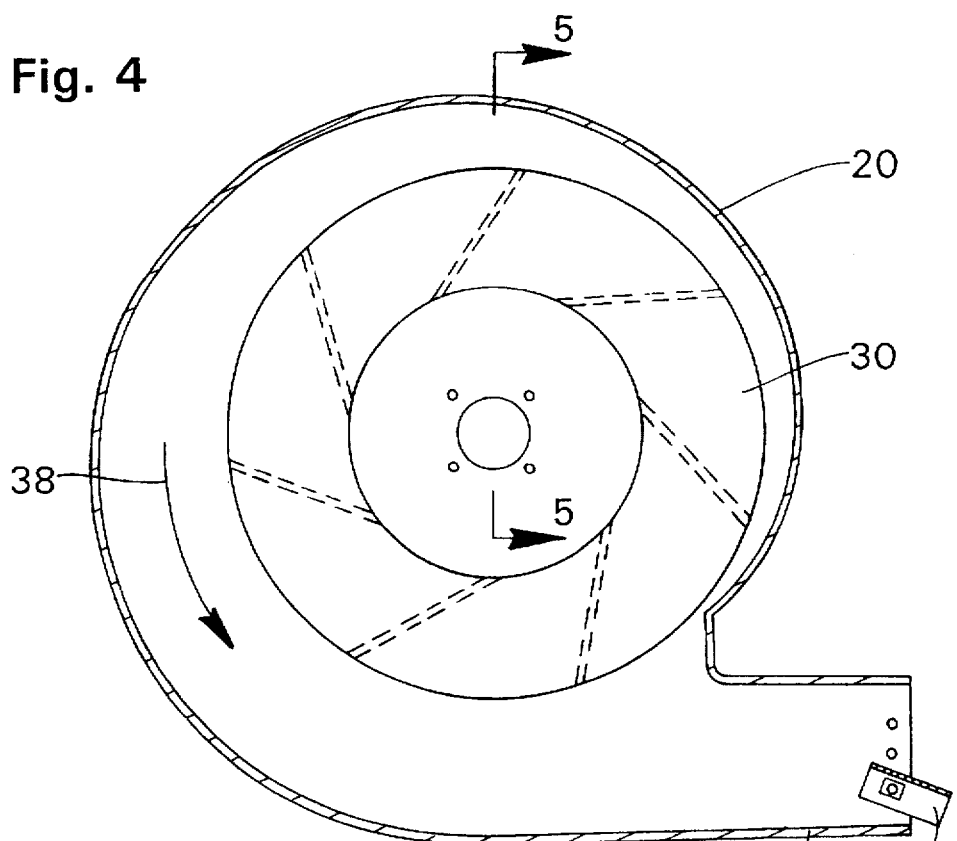
FIG. 4 is a cross-sectional view taken along line 4—4 in FIG. 1.

As shown in FIG. 4, a fan 30 is located in the blower housing 20. The fan 30 is drivingly connected to the motor 18 and is turned to generate an air flow, represented by arrows 40, having a predetermined volumetric flow which is determined by the motor speed and fan configuration.

An annular intake 28 is preferably attached to the blower housing 20 around the inlet opening 22. The annular intake 28 preferably includes two annular openings located between first, second and third curved vanes 28a, 28b and 28c, which provide a smooth air flow, represented by arrows 29, into the inlet opening 22. A smooth wire guard 31 is also provided between the first and second vanes 28a and 28b to prevent a user from inserting their hand through the intake 28 and the inlet opening 22 into the housing 20, and connects the first and second vanes 28a and 28b together. The intake 28 is sized such that the paths between the vanes 28a, 28b and 28c are long enough to prevent a user from reaching into the blower housing 20 to prevent possible injury.

Preferably, the annular intake 28 is made from steel and is attached with screws or other removable fasteners to the blower housing 20. However, it will be recognized by those skilled in the art from the present disclosure that the annular intake 28 could be made from other materials, such as fiberglass or other composite materials, if desired. It will also be recognized by those skilled in the art from the present disclosure that the annular intake 28 can be replaced with a grill if a smooth air flow 29 and an uniform velocity from the discharge chute 24, as discussed in detail below, are not required.

Figure 5:
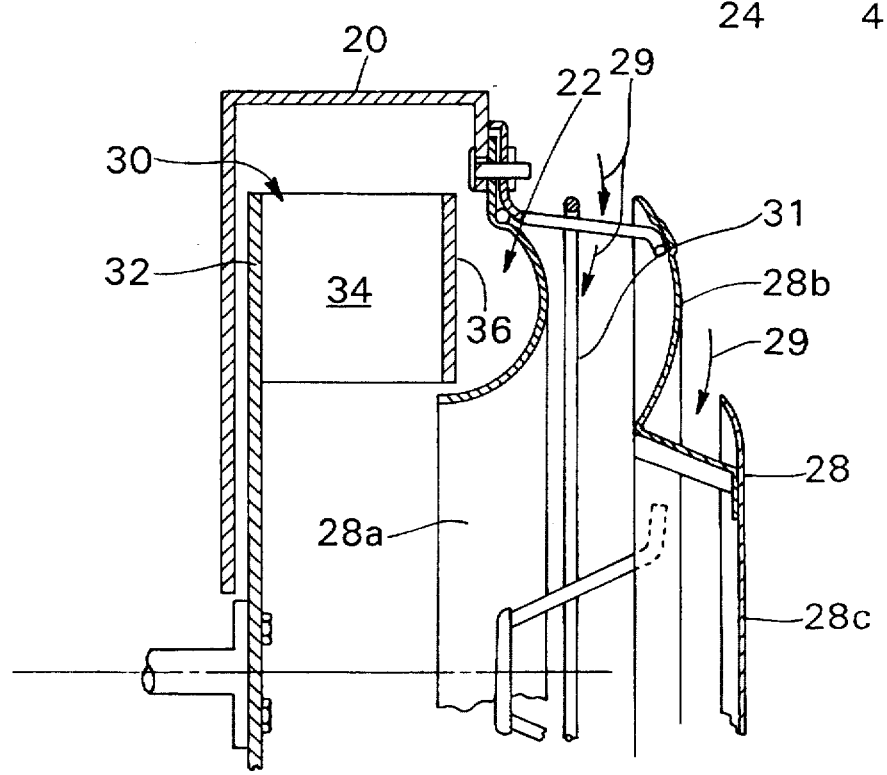
FIG. 5 is a cross-sectional view taken along line 5—5 in FIG. 4.

Referring now to FIG. 5, preferably the fan 30 includes a base pilate 32 and a plurality of equi-circumferentially spaced, backwardly inclined blades 34 which have first and second edges 34a, 34b. The first edges 34a are attached to the base plate 32. In order to increase the fan efficiency, an inlet ring 36 is attached to the second edges 34b of the blades 34. Preferably, the inlet ring 36 has an opening which is slightly greater in size than the opening in the first vane 28a of the intake 28 to improve the blower efficiency. In the preferred embodiment, the fan 30 is a welded assembly, and the blades 34 are made of at least 0.135 inch thick steel. However, it will be recognized by those skilled in the art from the present disclosure that the fan could be made from other types and/or thicknesses of materials and could be assembled with rivets or other types of fasteners, if desired. Preferably, the fan 30 is dynamically balanced in order to prevent vibration and premature wear of the motor bearings and other components.

As shown in FIG. 4, the blades 34 are backwardly inclined with respect to the direction of rotation, indicated by arrow 38, and the fan 30 is positioned closer to one side of the blower housing 20 to generate a swept flow of air in the blower housing 20 toward the discharge chute 24. This configuration provides a high volumetric air flow in comparison to the prior known radially spaced fan blade configurations. However, it will be recognized by those skilled in the art from the present disclosure that other types of fan blade configurations may be used, if desired.

Figure 8:
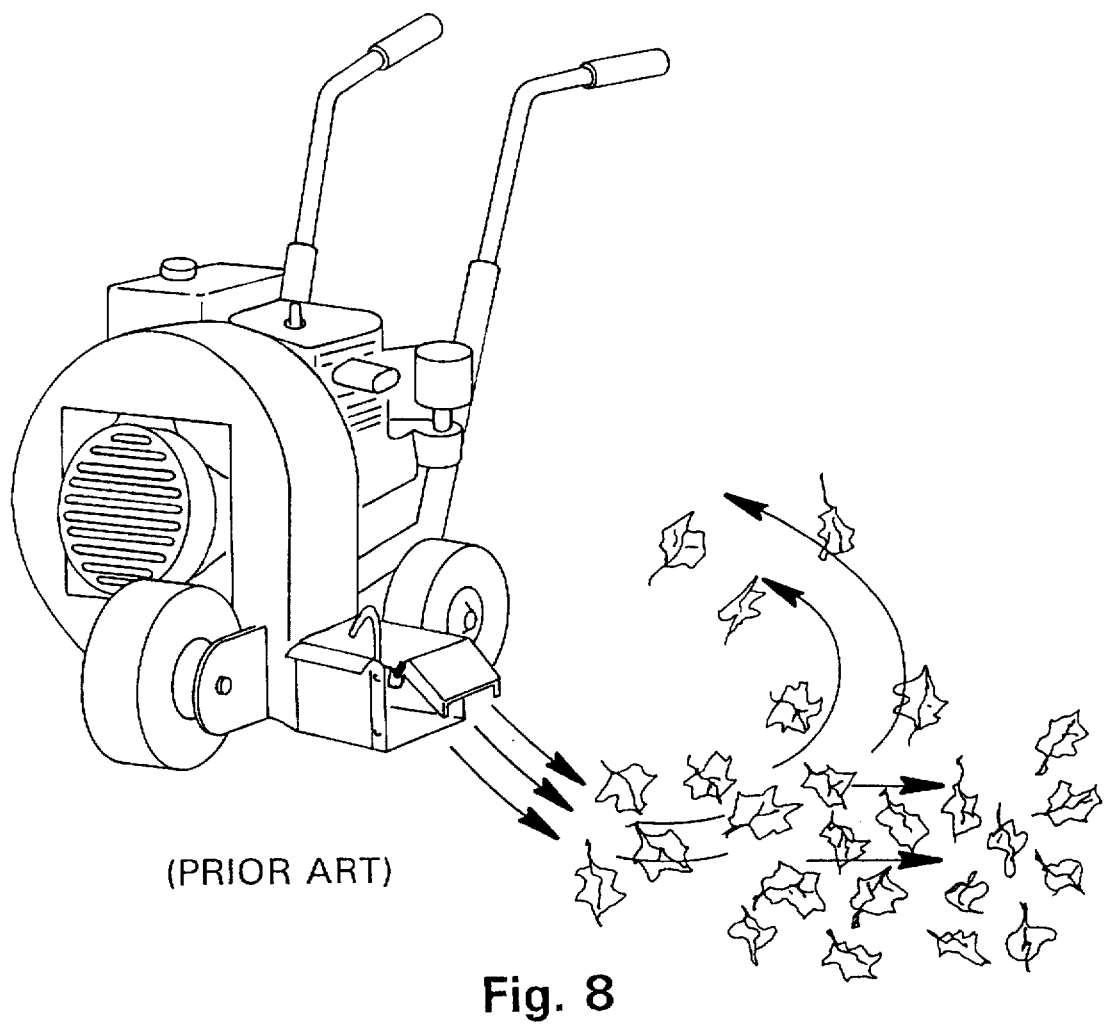
FIG. 8 is a perspective view showing a blower in accordance with the prior art.

Referring to FIGS. 1–4, the blower 10 further includes an adjustable height, pivotable deflector 48 mounted in the discharge chute 24 to split the air flow 40 into upper and lower portions 40a, 40b. As shown in detail in FIGS. 2 and 3, the deflector 48 is located within the discharge chute 24 to provide a reduced blower width as compared to the prior art blowers, as shown in FIG. 8, and prevents damage to the deflector 48. The deflector 48 is mountable in a plurality of vertically spaced apart, aligned pairs of apertures 50 located in the discharge chute 24. The deflector 48 is selectively positionable in each aligned pair of apertures 50 to vary the air volume being deflected.

Figure 2:
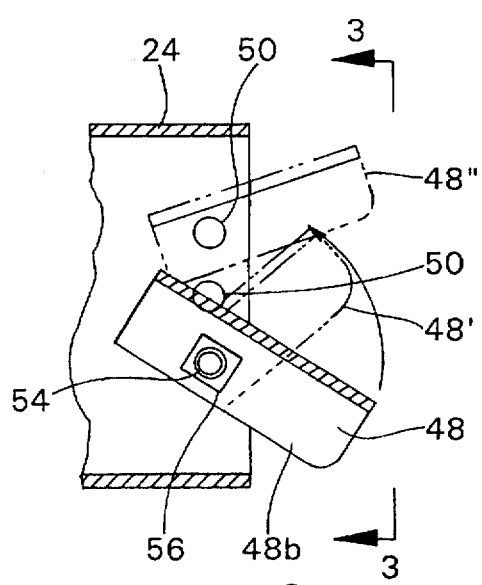
FIG. 2 is a cross-sectional view taken along line 2—2 in FIG. 1.
Figure 3:
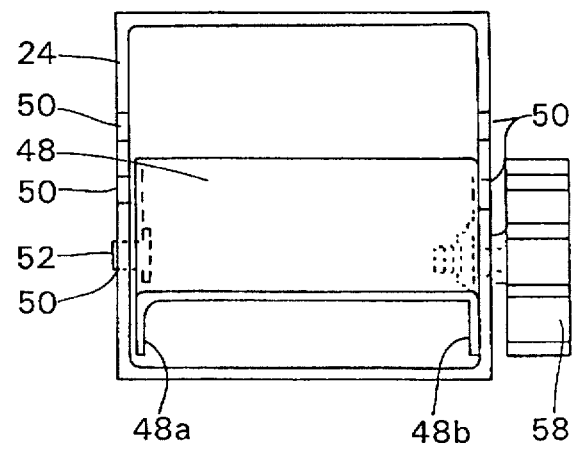
FIG. 3 is a right side view looking into the discharge chute taken along line 3—3 in FIG. 2.

The deflector 48 is pivotable from a first, downwardly inclined position as shown in FIG. 2 to concentrate the lower portion 40b of the air flow 40 along the surface to create a lifting force for lifting and moving the debris, such as the leaves 12 shown in FIG. 1, while the upper portion 40a of the air flow 40 moves the debris outwardly. The deflector 48 can be pivotably adjusted to a second position, shown in phantom in FIG. 2 and designated 48', in which the deflector 48' is upwardly inclined, to create an expanded air flow profile for moving piles of debris such as windrows of leaves 12. The height of the deflector 48 is also adjustable to adjust the volumetric flow of the upper and lower portions 40a and 40b of the air flow, and can be moved into a variety of positions, for example 48" shown in FIG. 2.

Preferably, the deflector 48 is channel shaped, and includes first and second flanges 48a, 48b. A stud 52 having a smaller diameter than the apertures 50 extends from the first flange 48a at a position near the middle of the deflector 48. An aperture 54 is provided in the second flange 48b of the deflector 48 in an aligned position with the stud 52, and a plate nut 56 is preferably welded to the inside of the second flange 48b in alignment with the aperture 54. A threaded knob 58 is inserted through an aligned aperture 50 opposite to the aperture 50 in which the stud 52 is located, and is threadingly engaged with the plate nut 56 to clamp the deflector 48 in position. The deflector 48 can be moved upwardly or downwardly by loosening and removing the knob 58 and rotating the deflector 48 out of the discharge chute 24 such that the stud 52 is disengaged from the aligned aperture 50. The deflector 48 is then reinstalled in the selected position. Positive clamp-up is provided by the knob 58 between the second flange 48b of the deflector 48 and the wall of the discharge chute 24 to hold the deflector 48 in position. Because the deflector 48 is pivoted about a position near its center, the discharge air flow 40 does not cause the deflector 48 to change position, which is more prevalent with the prior deflectors which are mounted at one end.

In the preferred embodiment, the deflector 48 is made from 0.105 inch thick sheet metal (12 gage). However, it will be recognized by those skilled in the art from the present disclosure, that the deflector 48 could be made of other types and/or thicknesses of material, and can be made without the flanges 48a, 48b, if desired. It will be similarly recognized by those skilled in the art from the present disclosure that the deflector 48 can be mounted by other means within the discharge chute 24 to provide both pivotable movement and height adjustability. For example, the deflector 48 could be mounted in vertical slots for continuous vertical adjustability or could be mounted on pivot arms (not shown).

Figure 6:
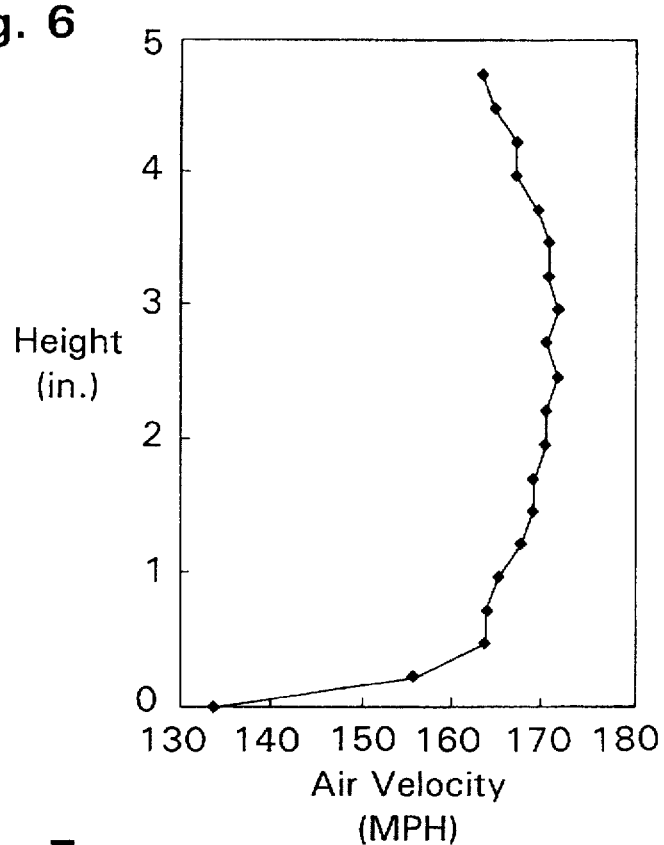
FIG. 6 is a graph showing a velocity profile of the air flow from the outlet duct of the present invention with an aerodynamic air intake.

Referring now to FIG. 6, an air velocity profile taken across the height of the discharge chute is shown for the blower 10 having the annuler intake 28. The velocity profile shows that the velocity is nearly constant across the entire height of the discharge chute 24 when the annular intake 28 is utilized. This helps to eliminate the swirling problem of the prior art device by providing a uniform velocity air flow across substantially the entire discharge chute 24.

Figure 7:
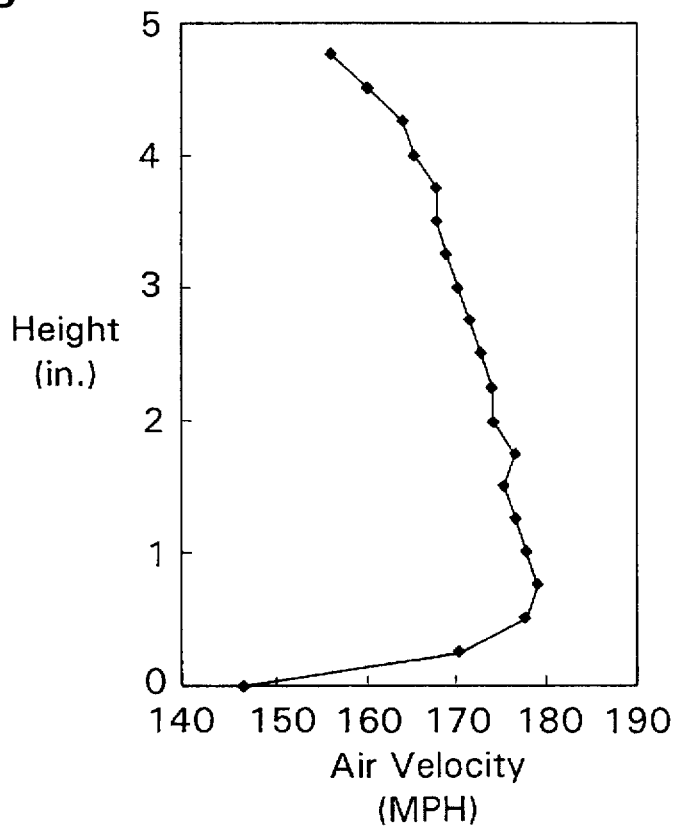
FIG. 7 is a graph showing the velocity profile of the air flow from the discharge chute of the present invention without the aerodynamic intake.

Referring now to FIG. 7, a graph showing the air velocity profile for the discharge chute 24 of a blower 10 with a standard intake is shown. This shows that the velocity at the bottom of the discharge chute 24 is higher than the velocity near the top of the discharge chute 24. This arrangement is more prone to causing a swirling effect with eddy currents of air carrying leaves or other debris back into the path cleared by the blower 10. While this problem is reduced through the use of the deflector 48 located in the discharge chute 24 to split the air flow, the uniform velocity profile at the discharge chute 24 can further reduce or eliminate the swirling problem.

The data shown in FIG. 6 was generated using a prototype of the annular intake 28, and the gap between the inside of the first vane 28a and the inlet ring 36 was over 0.5 inches. This resulted in a minor loss in efficiency in comparison to the data shown in FIG. 7 from the unit with the standard inlet. However, the performance using the annular intake 28 with a closer fit to the inlet ring 36 would provide at least the same air flow with the uniform velocity profile, which is more effective for moving debris and leaves 12.

While the blower 10 has been discussed for moving leaves 12 or other debris with high velocity air from the discharge chute 24, those skilled in the art will similarly recognize that the blower 10 can be used for vacuuming by removing the annular intake 28 and attaching a vacuum hose to the inlet opening 22. The heavy duty welded fan construction of the present invention allows the fan 23 to be used directly in the path of the debris flow, which is drawn through the inlet opening 22 and expelled through the discharge chute 24.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An improved blower for moving debris on a surface, comprising:
    a frame mounted on wheels, a motor mounted to the frame, and a blower housing with an inlet opening and an discharge chute mounted on the frame;
    a fan located in the blower housing and drivingly connected to the motor to generate an air flow having a predetermined volumetric flow;
    an adjustable height, pivotable deflector mounted in the discharge chute to split the air flow into upper and lower portions, the deflector being pivotable from a first, downwardly inclined position, to concentrate the lower portion of the air flow along the surface to create a lifting force for lifting and moving the debris while the upper portion of the air flow moves the debris outwardly, to a second position, in which the pivotable deflector is upwardly inclined to create an expanded air flow profile for moving piles of debris, the height of the deflector being adjustable to adjust the volumetric flow of the upper and lower portions.

2. The blower of claim 1 wherein the deflector is located within said discharge chute.

3. The blower of claim 1 wherein a plurality of vertically spaced apart, aligned pairs apertures are located in the discharge chute, and the deflector is selectively positionable in each aligned pair of apertures to vary the air volume being deflected.

4. The blower of claim 1 further comprising an annular intake located on the blower housing over the inlet opening to provide a uniform velocity air flow profile from the discharge chute.

5. The blower of claim 1 wherein the fan includes a base plate, a plurality of equi-circumferentially spaced, backwardly inclined blades having first and second edges, the first edges being attached to the base plate, and an inlet ring attached to the second edges of the blades.

6. The blower of claim 5 wherein the blades are made of at least 0.135 inch thick steel.

* * * * *